United States Patent
Bristow et al.

(10) Patent No.: US 12,553,207 B2
(45) Date of Patent: Feb. 17, 2026

(54) POST-TENSIONED WIND TURBINE FOUNDATION

(71) Applicant: RUTE FOUNDATION SYSTEMS, INC., Portland, OR (US)

(72) Inventors: Matthew Bristow, St. Austell (GB); Doug Krause, Portland, OR (US); Evelyn Hunsberger, Havelock North (NZ)

(73) Assignee: RUTE FOUNDATION SYSTEMS, INC., Portland, OR (US)

( * ) Notice: Subject to any disclaimer, the term of this patent is extended or adjusted under 35 U.S.C. 154(b) by 175 days.

(21) Appl. No.: 18/185,050

(22) Filed: Mar. 16, 2023

(65) Prior Publication Data

US 2023/0295891 A1    Sep. 21, 2023

Related U.S. Application Data

(60) Provisional application No. 63/320,753, filed on Mar. 17, 2022.

(51) Int. Cl.
| | | |
|---|---|---|
| *E02D 27/00* | (2006.01) | |
| *E02D 27/01* | (2006.01) | |
| *E02D 27/08* | (2006.01) | |
| *E02D 27/42* | (2006.01) | |
| *E02D 27/50* | (2006.01) | |

(52) U.S. Cl.
CPC ......... *E02D 27/425* (2013.01); *E02D 27/016* (2013.01); *E02D 27/08* (2013.01); *E02D 27/50* (2013.01); *E02D 2200/1664* (2013.01); *E02D 2250/0046* (2013.01); *E02D 2300/0029* (2013.01); *E02D 2600/20* (2013.01)

(58) Field of Classification Search
CPC ....... E02D 27/00; E02D 27/42; E02D 27/425; E02D 27/50; E02D 27/016; E02D 27/08; E02D 2200/1664; E02D 2250/0046; E02D 2300/0029; E02D 2600/20
See application file for complete search history.

(56) References Cited

U.S. PATENT DOCUMENTS 7,437,857 B1    10/2008  Maguire et al.
7,618,217 B2 *  11/2009  Henderson .............. E02D 27/12
                                                      52/294

(Continued)

FOREIGN PATENT DOCUMENTS

JP    2012-012929 A    1/2012

OTHER PUBLICATIONS

"SDI 19.6-PC Internal Unbonded Flex Filler System", Schwager Davis, Inc., Post-tension System Library, Aug. 16, 2018 (1 page).

(Continued)

*Primary Examiner* — Chi Q Nguyen
(74) *Attorney, Agent, or Firm* — Merchant & Gould P.C.

(57) ABSTRACT

A post-tensioning system that is configured for use with concrete wind turbine foundation designs to post-tension the foundations and reduce the amount of reinforcement steel that is needed compared to conventional non-post-tensioned, steel reinforced concrete foundation designs. In the case of an inverted T gravity foundation, the post-tensioning system described herein reduces the amount of reinforcement steel that is required by 30-40 tons.

20 Claims, 9 Drawing Sheets

(56) References Cited

U.S. PATENT DOCUMENTS

| | | | |
|---|---|---|---|
| 8,341,788 B2* | 1/2013 | Kim | E01D 19/00 |
| | | | 14/77.3 |
| 8,661,752 B2 | 3/2014 | Phuly | |
| 9,003,721 B1* | 4/2015 | Jensen | E02D 27/42 |
| | | | 52/294 |
| 9,481,973 B2* | 11/2016 | Henderson | E02D 27/02 |
| 9,938,685 B2 | 4/2018 | Krause | |
| 10,422,323 B2* | 9/2019 | Sandvad | E02D 27/425 |
| 10,767,889 B2 | 9/2020 | Urakawa | |
| 10,920,443 B2* | 2/2021 | Rabaut | F03D 13/25 |
| 11,428,363 B2* | 8/2022 | Aboumalwa | F16M 11/22 |
| 11,434,617 B2* | 9/2022 | Henderson | E02D 27/08 |
| 11,661,718 B2* | 5/2023 | Henderson | E02D 5/38 |
| | | | 52/297 |
| 12,018,448 B2* | 6/2024 | Duarte Trigo | F03D 13/22 |
| 2005/0034392 A1 | 2/2005 | Nuetzel et al. | |
| 2008/0072511 A1* | 3/2008 | Phuly | E02D 27/28 |
| | | | 52/294 |
| 2012/0047830 A1 | 3/2012 | Phuly | |
| 2013/0255169 A1* | 10/2013 | Henderson | E02D 27/32 |
| | | | 52/223.13 |
| 2014/0033628 A1 | 2/2014 | Lockwood et al. | |
| 2018/0355851 A1* | 12/2018 | Brohm | E04H 12/34 |

OTHER PUBLICATIONS

"SDI 19.6 Anchor Head", Schwager Davis, Inc., Post-tension System Library, Nov. 28, 2011 (1 page).

"SDI 19.6-PC1 Bearing Plate", Schwager Davis, Inc., Post-tension System Library, Sep. 23, 2013 (1 page).

International Search Report, International Patent Application No. PCT/IB/2023/052600, Jun. 9, 2023 (13 pages).

* cited by examiner

POST-TENSIONED WIND TURBINE FOUNDATION

FIELD

This technical disclosure relates to post-tensioning of wind turbine foundations.

BACKGROUND

From 2002 to 2022, the wind power industry has grown from 1 gigawatt of installed machinery power capacity to 743 gigawatts of machinery power capacity. In that time, the foundations for the wind turbine tower have remained substantially the same type, namely a cast-in-place concrete inverted T gravity foundation, commonly known as a "spread" foundation. The inverted T gravity foundation acts as a raft foundation under extreme bending resistance to the tower's overturning force. As the average wind turbine sizes have increased from 1 MW in 2002 to 5 MW in 2022, the tower force has increased proportionally, including a) the amount of tower anchor rods that are connected mid depth in the concrete, and b) the bending stress on the concrete foundation. The anchor rod equipment and the steel reinforcement that is used to resist the tensile forces are known to create space and stress zone conflicts. In addition, as the tower size increases, the space and stress capacity conflicts in the inverted T gravity foundation design are exacerbated. In 2022, for a 5 MW wind turbine, the inverted T gravity foundation typically uses about 70 tons of steel to reinforce the concrete foundation.

SUMMARY

A post-tensioning system is described which is configured for use with concrete wind turbine foundation designs to post-tension the foundations and reduce the amount of reinforcement steel that is needed compared to conventional non-post-tensioned, steel reinforced concrete foundation designs. The concrete wind turbine foundation can be any wind turbine foundation design including, but not limited to, an inverted T gravity concrete foundation, or the concrete foundations disclosed in U.S. Pat. Nos. 8,661,752, 9,938,685, and 10,767,889, each of which is incorporated herein by reference in its entirety. In the case of an inverted T gravity foundation, the post-tensioning system described herein reduces the amount of reinforcement steel that is required by 30-40 tons.

The post-tensioning system described herein includes a number of elements that function together to post-tension the concrete wind turbine foundation, for example in a vertical direction and in two generally horizontal directions. The post-tensioning system can include rod anchors, anchor rods that are engageable with the rod anchors, post-tensioning strands, and post-tensioning strand anchors. In one embodiment, the post-tensioning system may also include one or more tower interface elements including, but not limited to, one or more adapter plates, one or more spreader plates, or one or more bearing plates.

In one embodiment described herein, a post-tensioning system of a wind turbine foundation can include rod anchors, anchor rods that are engageable with the rod anchors, post-tensioning strands, and post-tensioning strand anchors. The rod anchors are configured to be engageable with a bottom end of the center hub of the wind turbine foundation, the anchor rods have lower ends that are connectable to the rod anchors, and the post-tensioning strand anchors are configured to bear on or be embedded within a perimeter of the wind turbine foundation. Each post-tensioning strand anchor includes a plurality of sub-strand through holes for receiving ends of a plurality of sub-strands of the post-tensioning strands, with the ends of the sub-strands of the post-tensioning strands fixed to the post-tensioning strand anchors.

In another embodiment described herein, a wind turbine foundation can include a concrete structure having a center hub and a perimeter edge, where the center hub includes an upper end and a bottom end. The post-tensioning system, including the rod anchors, the anchor rods, the post-tensioning strands, and the post-tensioning strand anchors, post-tensions the concrete structure. In particular, the rod anchors are engaged with the bottom end of the center hub, and the anchor rods extend through the center hub with lower ends of the anchor rods being connected to the rod anchors. In addition, at least some of the post-tensioning strands extend through the center hub, and the post-tensioning strand anchors bear on or are embedded within the perimeter edge, and a plurality of sub-strands of the post-tensioning strands extend through each post-tensioning strand anchor and are secured to the post-tensioning strand anchors.

DRAWINGS

DETAILED DESCRIPTION

Figure 1:
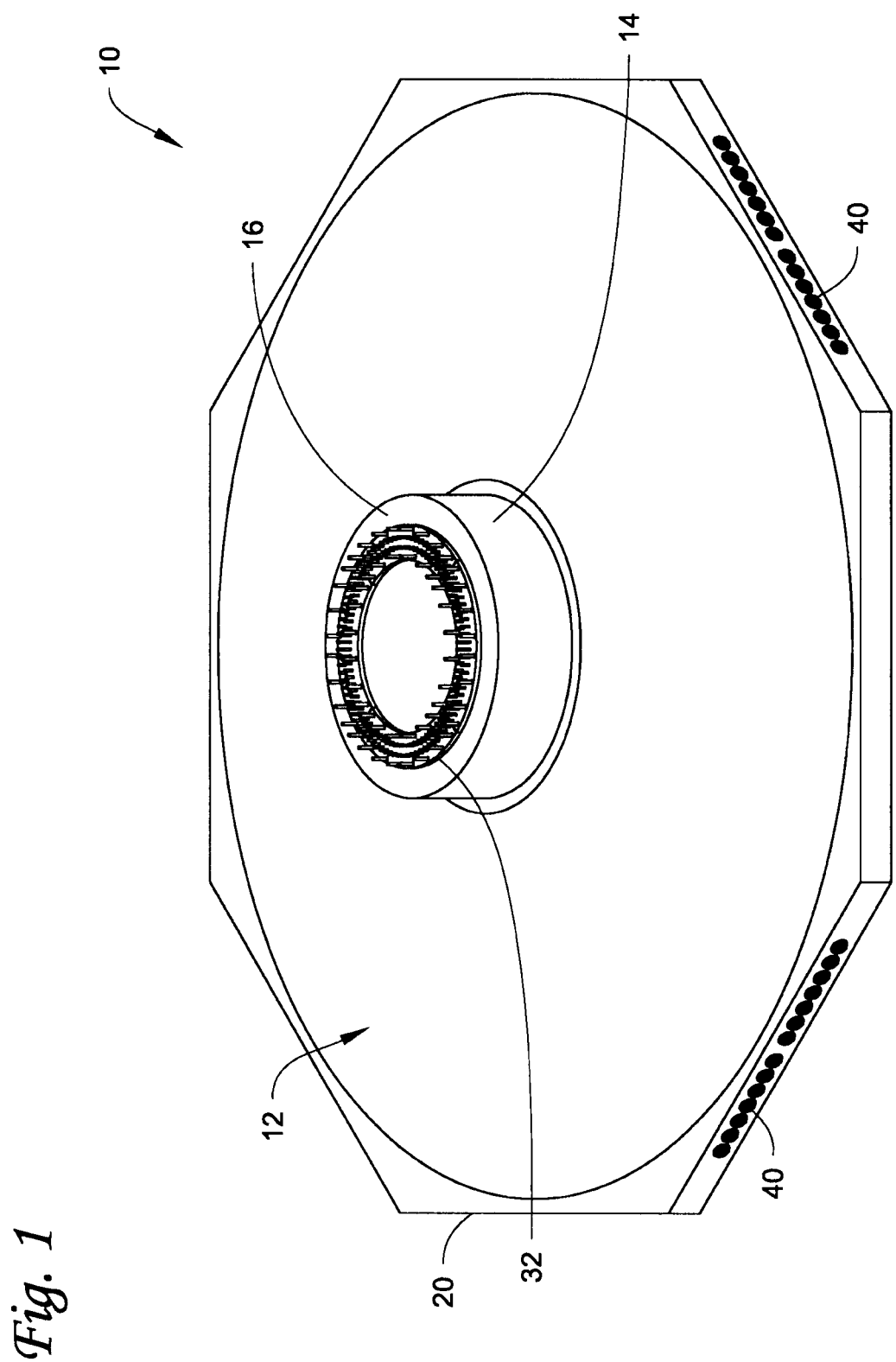
FIG. 1 is a top perspective view of a post-tensioned concrete wind turbine foundation described herein.
Figure 2:
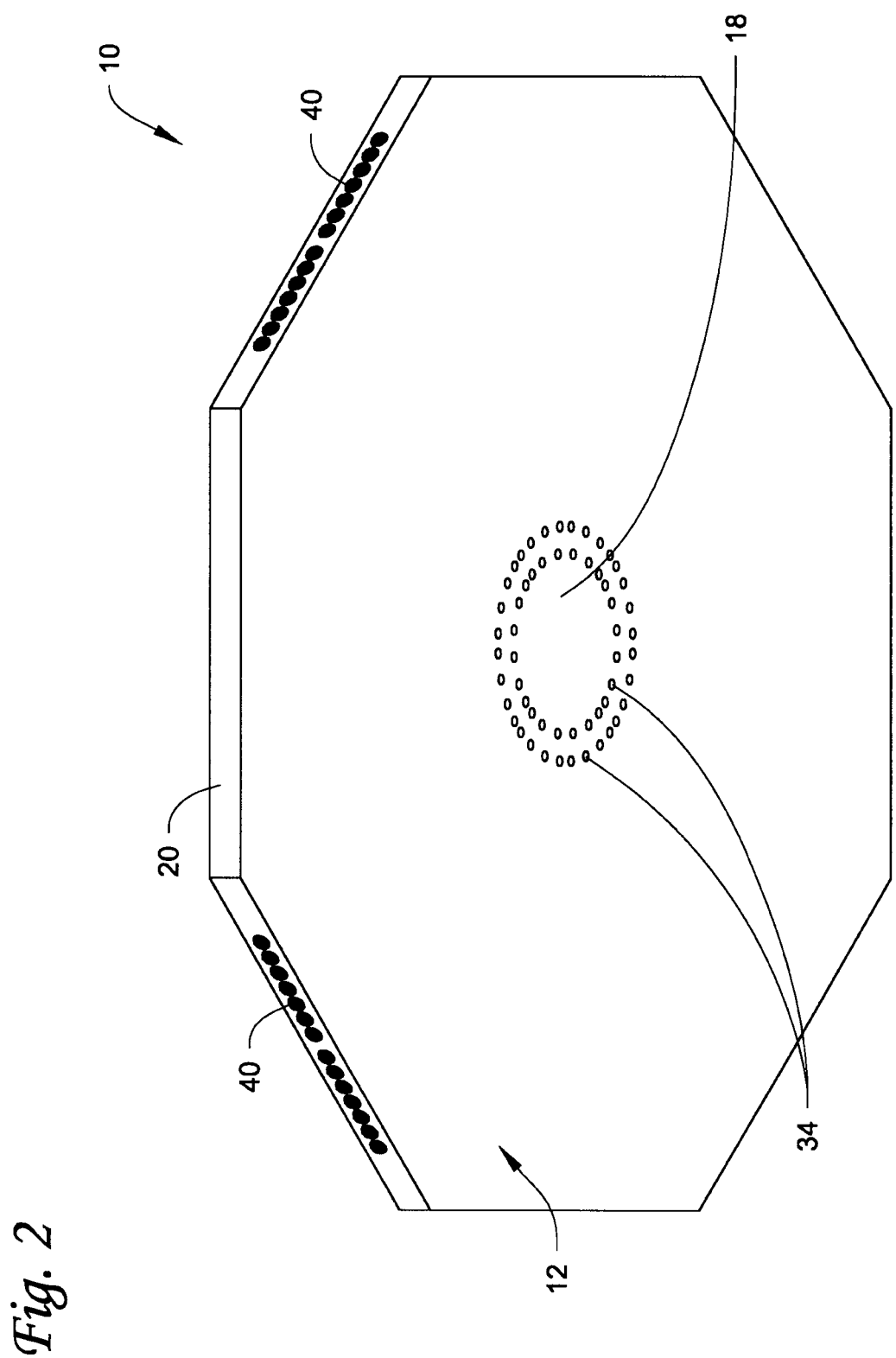
FIG. 2 is a bottom perspective view of the post-tensioned concrete wind turbine foundation of FIG. 1.
Figure 3:
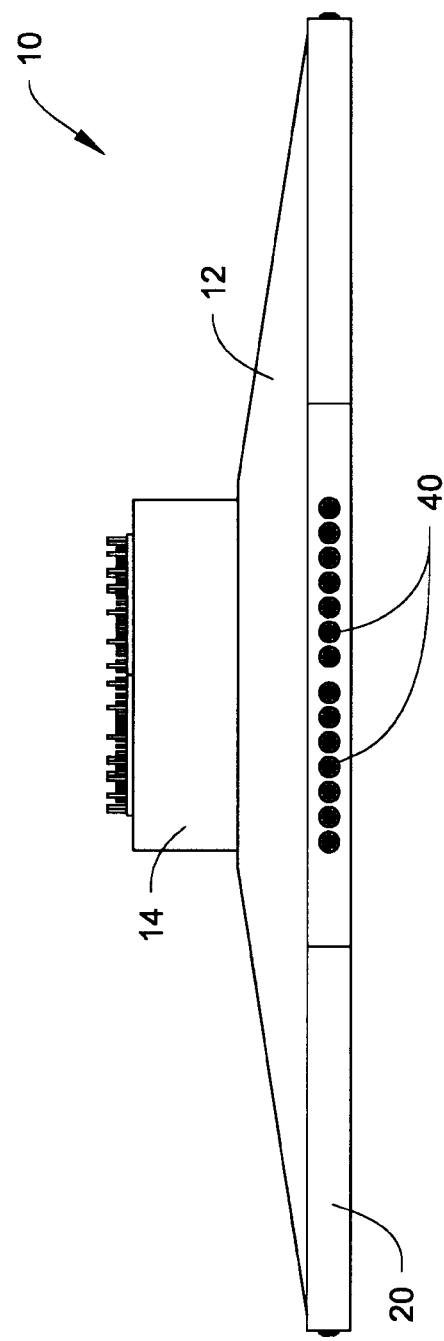
FIG. 3 is a side view of the post-tensioned concrete wind turbine foundation of FIGS. 1 and 2.

FIGS. 1-3 depict an example of a post-tensioned concrete wind turbine foundation 10. The foundation 10 in FIGS. 1-3 is depicted as an inverted T gravity concrete foundation (also known as a spread foundation). The foundation 10 may alternatively be configured like the foundations disclosed in U.S. Pat. Nos. 8,661,752, 9,938,685, and 10,767,889, each of which is incorporated herein by reference in its entirety. The foundation 10 may be formed from poured in place concrete or the foundation 10 may be formed from prefabricated concrete sections that are assembled together to form the foundation 10. For sake of convenience in describing the inventive concepts, the foundation 10 will be assumed to be an inverted T gravity concrete foundation. However, the inventive concepts described herein can be used on other types of concrete wind turbine foundations including wind turbine foundations formed from pre-fabricated concrete sections.

Regardless of how the foundation 10 is formed, the foundation 10 includes at least the concrete and the post-tensioning system described further below that post-tensions the foundation 10. Post-tensioning refers to applying pre-stressing forces to the foundation 10 after the concrete thereof has set (in the case of a poured in place concrete foundation), or after pre-fabricated concrete sections of the foundation have been assembled together.

FIGS. 1-3 depict the foundation 10 as including a concrete body 12 forming the majority of the foundation with a center hub (or pedestal) 14 having an upper end 16 and a bottom end 18. The concrete body 12 extends radially from the center hub 14 to a perimeter edge 20. The perimeter edge 20 is depicted as having eight linear or straight sections. However, a smaller or larger number of straight sections can be provided, or the perimeter edge 20 can be entirely circular.

Figure 4:
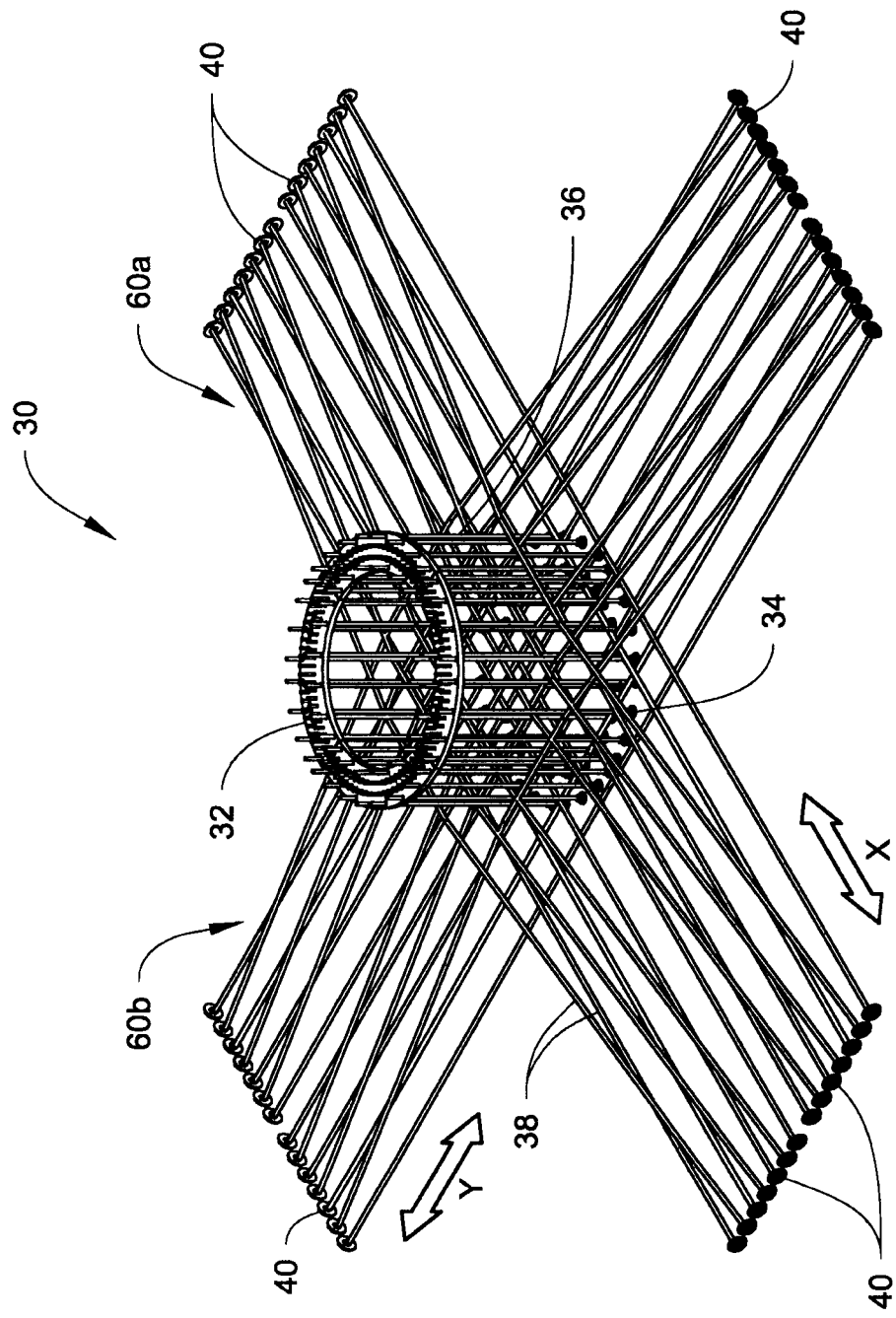
FIG. 4 is a perspective view of the elements of one example of the post-tensioning system as they would be arranged in the wind turbine foundation with the concrete of the wind turbine foundation removed.
Figure 5:
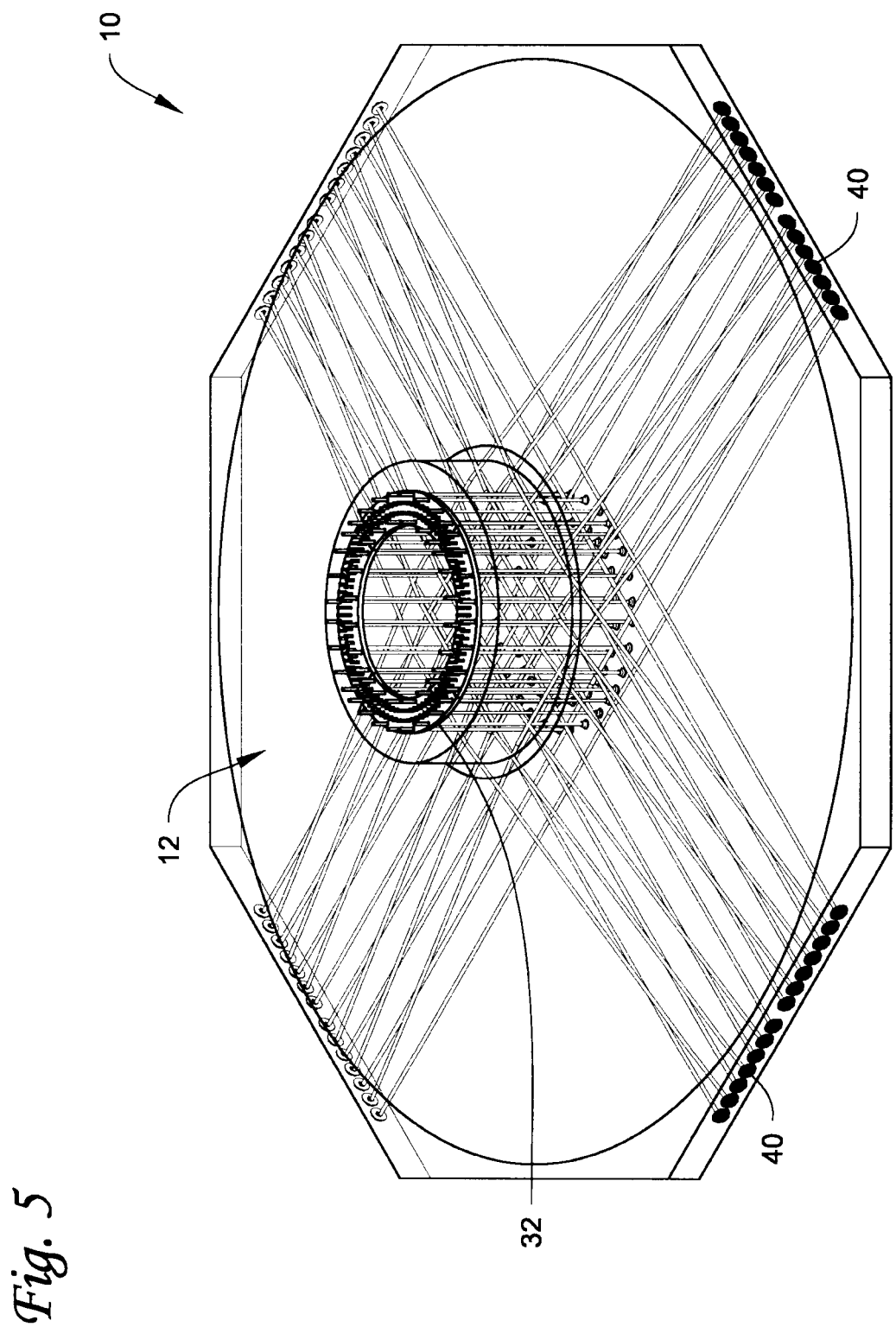
FIG. 5 is a to perspective view of the post-tensioned concrete wind turbine foundation of FIGS. 1-3 with the concrete shown as being transparent to show the elements of the post-tensioning system.

The foundation 10 includes a post-tensioning system 30, an example of which is seen in FIGS. 4 and 5, that interacts with the concrete of the foundation 10 to post-tension the concrete. Post-tensioning refers to prestressing the concrete after the concrete has hardened. In an embodiment, the post-tensioning system 30 can post-tension the foundation 10 in multiple directions, for example in a vertical direction and in two horizontal directions (or in an X-Y plane when viewed in a top or bottom view). As described in further detail below, the post-tensioning system 30 can include a tower interface 32, rod anchors 34, anchor rods 36 that extend through the tower interface 32 and are secured to the rod anchors 34, post-tensioning strands 38, and post-tensioning strand anchors 40. In one embodiment, the tower interface 32 is not part of the post-tensioning system 30 which then comprises the rod anchors 34, the anchor rods 36, the post-tensioning strands 38, and the post-tensioning strand anchors 40.

Figure 6:
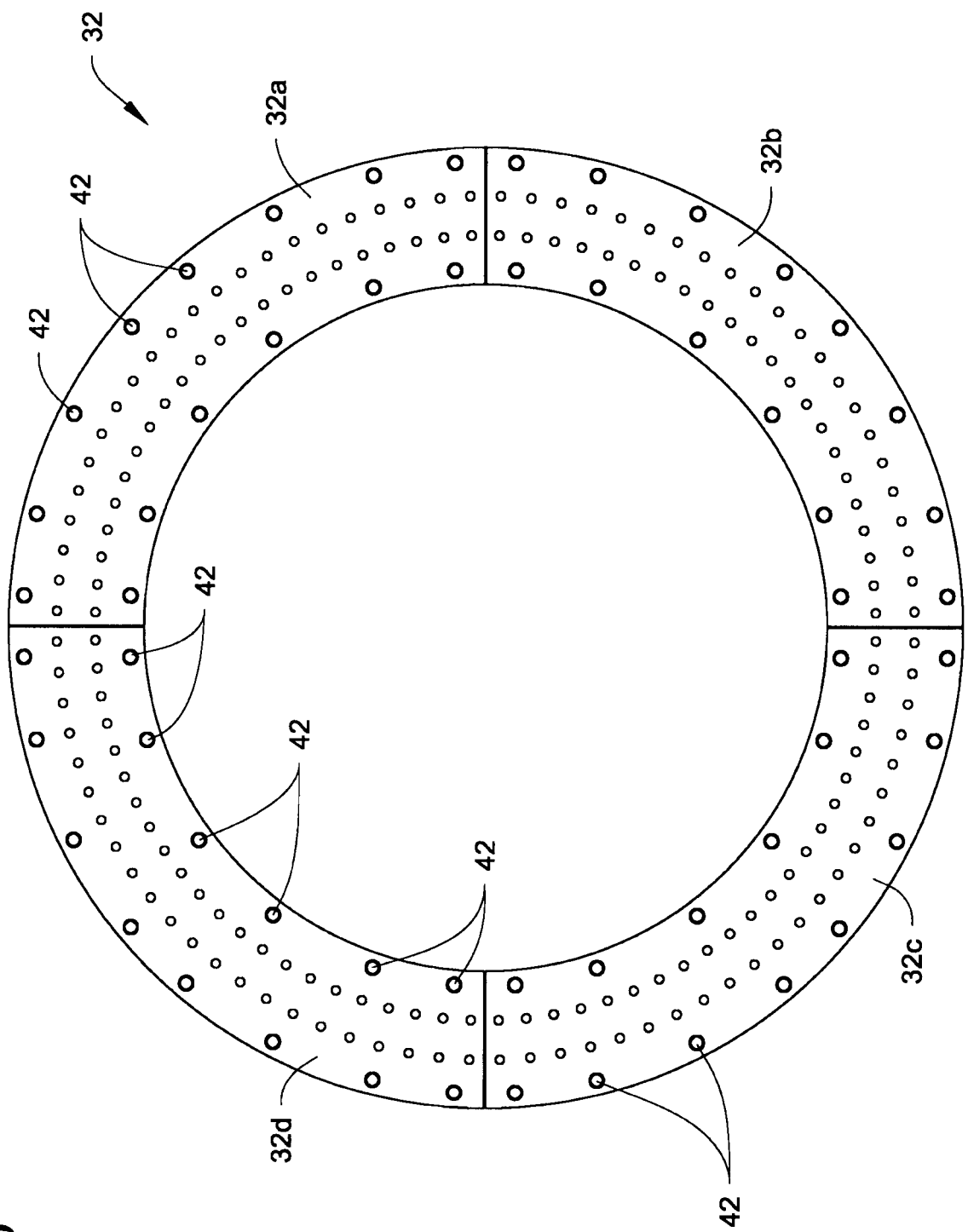
FIG. 6 is a top view of an example of a tower interface element in the form of an adapter plate of the post-tensioning system.

Referring to FIGS. 1 and 4-6, the tower interface 32 can be any structure suitable for helping to connect the hub 14 of the foundation 10 to the wind turbine tower (not shown). Examples of tower interfaces 32 that can be used include, but are not limited to, one or more adapter plates, one or more spreader plates, and one or more bearing plates. The tower interface 32 is illustrated as being an adapter plate. However, the tower interface 32 can have other constructions. The tower interface 32 is a metal or steel plate(s) that is configured to be engageable with and reside at or near the upper end 16 of the center hub 14. As best seen in FIG. 6, the tower interface 32 has a plurality of through holes 42 extending therethrough. In the example of the tower interface 32 being an adapter plate, the through holes 42 are arranged in an inner array along a first circumference, and an outer array along a second circumference greater than the first circumference. In the example illustrated in FIG. 6, the adapter plate is formed in a plurality of segments, for example four segments 32a, 32b, 32c, 32d, that when assembled form a continuous ring. However, other constructions of the tower interface 32 are possible.

In the illustrated example, the tower interface 32 is depicted as residing at or near the upper end 16 of the hub 14 and upper ends of the anchor rods 36 extend through the through holes 42 of the tower interface 32. The upper ends of the anchor rods 36 can be threaded and nuts can be threaded onto the upper ends of the anchor 36 to fix the upper ends to the tower interface 32. The general construction and operation of the tower interface 32 is known in the art.

Referring to FIGS. 2, 4-5 and 7A-7B, the rod anchors 34 are metal or steel elements that are configured to be engageable with the bottom end 18 of the center hub 14 generally opposite the tower interface 32. As best seen in FIGS. 2 and 4-5, the rod anchors 34 are arranged in an inner array and an outer array that are aligned with the through holes 42 of the tower interface 32.

Figure 7A:
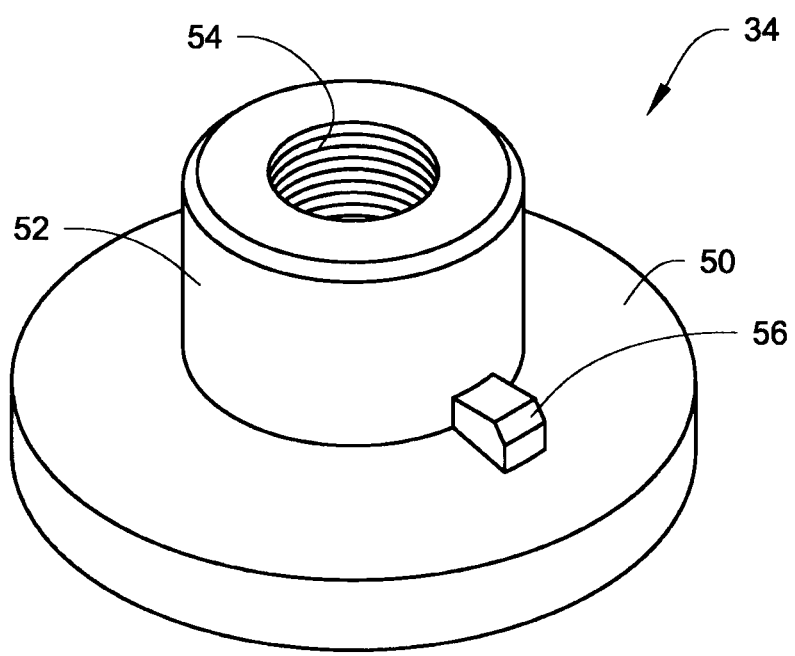
FIGS. 7A and 7B are perspective and cross-sectional views, respectively, of a rod anchor of the post-tensioning system.
Figure 7B:
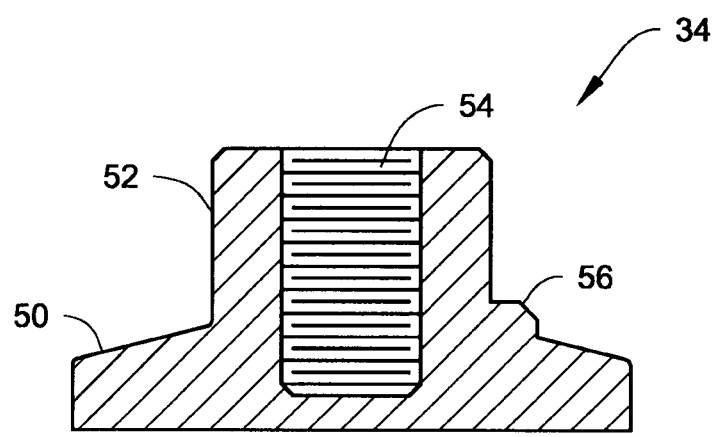

Referring to FIGS. 7A and 7B, each one of the rod anchors 34 includes a base plate 50 and a central boss 52 integrally formed with, connected to and extending upwardly away from the base plate 50. The base plate 50 can be circular, square, rectangular, or other shapes. The central boss 52 includes a threaded hole 54 formed therein that extends from the upper end of the boss 52 toward the base plate 50 stopping short of the bottom of the base plate 50. In another embodiment, the threaded hole 54 may extend completely through the boss 52 and the base plate 50. The rod anchors 34 may further include one or more anti-rotation chines 56 formed thereon which prevent rotation of the rod anchors 34 relative to the hub 14 during use. The second ends of the anchor rods 36 are threaded and are threaded into the threaded holes 54 of the rod anchors 34 to secure the anchor rods 36 to the rod anchors 34.

In another embodiment, the base plate 50 and the central boss 52 of the rod anchor 34 can be initially separate from one another and then attached to one another, for example via friction welding or other welding or fastening technique.

In another embodiment, the anchor rods 36 can be directly attached to the base plates 50 thereby eliminating the need for the central boss 52, in which case the base plates 50 form the rod anchors 34. The anchor rods 36 can be directly attached to the base plates 50 in any suitable manner, for example via friction welding or other welding or fastening technique.

In another embodiment, instead of or in addition to using the anchor rods 36, other elements can be used. For example, vertical post-tensioning strands with post-tensioning strand anchors, which can be similar to the post-tensioning strands 38 and the strand anchors 40, can be used in place of the anchor rods 36 and the rod anchors 34. In another example, full-length anchor bolts that interact with a bearing plate can be used in place of the anchor rods 36 and the rod anchors 34.

In the case of a poured in place foundation, the rod anchors 34 (and the anchor rods 36 or elements to be replaced by the anchor rods 36) can be arranged in position prior to pouring the concrete such that after the concrete is poured and the concrete sets, the rod anchors 34 are partially or completely embedded in the concrete at the bottom end 18 of the center hub 14 opposite the tower interface 32 such that all or some of each one of the rod anchors 34 is "countersunk" into the concrete at the bottom end 18 of the center hub 14 opposite the tower interface 32, with the bosses 52 facing generally vertically upward toward the tower interface 32. In the case of a foundation formed from pre-fabricated concrete sections, countersunk areas can be formed on the pre-fabricated sections that are sized to receive some or all of the rod anchors 34 or the pre-fabricated concrete sections can be formed with the rod anchors 34 in place.

Referring to FIGS. 1 and 3-5, the anchor rods 36 extend through anchor rod holes that are formed through the hub 14. In the case of a poured in place foundation, the anchor rod holes can be formed by pouring the concrete of the foundation around tubes that surround the anchor rods 36 (or elements to be replaced by the anchor rods) which are connected at their bottom ends to the rod anchors 34.

However, the anchor rod holes can be formed in any other suitable manner as well, for example by drilling through the concrete. In other embodiments, each anchor rod 36 can be encased in a sleeve of compressible foam material, or each anchor rod 36 can be wrapped with elastomeric or pliable material. The anchor rods 36, together with the rod anchors 34 and the tower interface 32, post-tension the foundation 10, in particular the hub 14, in a vertical direction. The anchor rods 36 are formed of metal or steel compatible with the material of the rod anchors 34 and the tower interface 32.

Referring to FIGS. 4 and 5, the post-tensioning strands 38 extend through the foundation 10 for use in post-tensioning the foundation 10 in one or more generally horizontal directions. In the illustrated example, the strands 38 can be oriented to post-tension the foundation 10 in two horizontal directions X, Y (when viewing the foundation 10 in a top or a bottom view, or generally in an X-Y plane) which may be at right angles to one another. The strands 38 extend through strand holes formed in the concrete of the foundation. In the case of a poured in place foundation, the strand holes may be formed by hollow tubes around which the concrete is poured and sets. The tubes can remain in place and the strands 38 can be run through the tubes, or the concrete can be poured with the strands 38 already extending through the tubes. As best seen in FIG. 4, a first set 60a of the strands 38 extend from one side of the perimeter 20 to the diametrically opposite side of the perimeter 20 in the general direction X, and a second set 60b of the strands 38 extend from one side of the perimeter 20 to the diametrically opposite side of the perimeter 20 in the general direction Y generally at right angles to the first set 60a. As seen in FIG. 4, in each set 60a, 60b, some of the strands 38 are oriented substantially laterally or substantially horizontally, and some of the strands 38 are oriented at angles to a horizontal plane which provide a vertical component of pre-stressing force. However, the post-tensioning forces are primarily in the horizontal directions (or in an X, Y plane when the foundation 10 is viewed in a top view).

In addition, in each set 60a, 60b, some of the strands 38 extend through the hub 14 passing between the anchor rods 36, while some of the strands bypass the hub (i.e. do not pass through the hub 14). At each end, the strands 38 are fixed to the strand anchors 40. The strands 38 can be formed of metal or steel.

Figure 9:
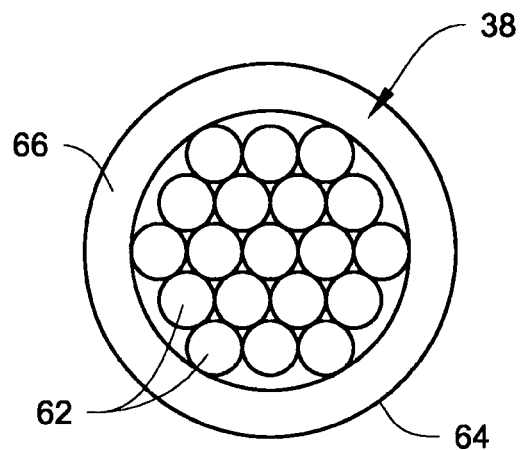
FIG. 9 depicts a post-tensioning strand assembly.

As depicted in FIG. 9, each strand 38 can be formed of multiple sub-strands 62 that together form the strand 38. There can be any number of sub-strands 62. In one embodiment, there are 19 sub-strands 62. FIG. 9 also depicts the strand 38 as being disposed within a tube 64 that is embedded within the concrete of the foundation (i.e. the tubes are positioned and the concrete is poured around the tubes). In one embodiment, a space or gap 66 between the strand 38 and the tube 64 can be partially or completely filled with a pliable material and/or anti-corrosive material such as wax or grease. In addition or alternatively, the strands 38 may be protected from corrosion by coating the strands 38 and/or the sub-strands 62 with corrosion inhibiting material and/or encasing in a plastic sheathing or any other suitable material. Similarly, in the case of the anchor rods 36, the spaces between the anchor rods 36 and the tubes forming the anchor rod holes can be partially or completely filled with a pliable material and/or anti-corrosive material such as wax or grease. In an embodiment, corrosion inhibiting material may extend only a short distance into the spaces 66 between the tubes 64 surrounding the strands 38 and/or the tubes around the anchor rods 36, and the corrosion inhibiting material is held in position by sealing material which may fill some or all of the remainder of the tube spaces 66. For example, the corrosion inhibiting material may extend a small distance inwardly from each one of the strand anchors 40 at opposite ends, with sealing material filling the remainder of the space 66. The sealing material may be expandable foam or elastomeric material. The sealing material may be introduced into the spaces 66 by a small injection device such as a pipe that can fit in the spaces 66.

Referring to FIGS. 1-5 and 8A-C, an example construction of the post-tensioning strand anchors 40 is depicted. The anchors 40 are configured to bear on or be embedded within the perimeter 20 of the foundation 10, and the ends of the strands 38 are fixed to the strand anchors 40. Each anchor 40 can include an anchorage plate 70 (which may also be referred to as a bearing plate), a central boss 72 connected to and extending away from the anchorage plate 70, a plurality of strengthening ribs 74 between the anchorage plate 70 and the boss 72, and a plurality of sub-strand through holes 76 extending through the anchorage plate 70 and the central boss 72.

Figure 8A:
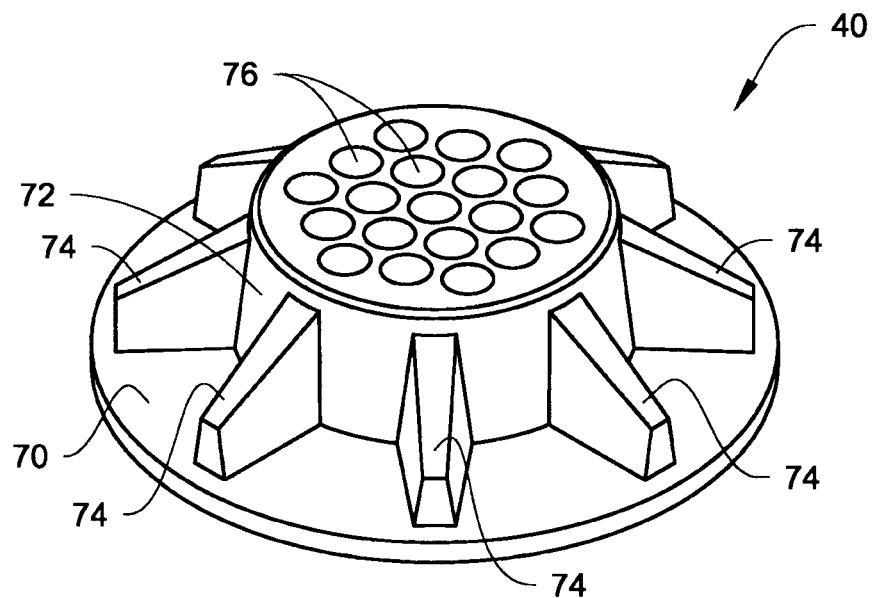
FIGS. 8A, 8B and 8C are perspective, top, and partial cross-sectional views, respectively, of a post-tensioning strand anchor of the post-tensioning system.
Figure 8B:
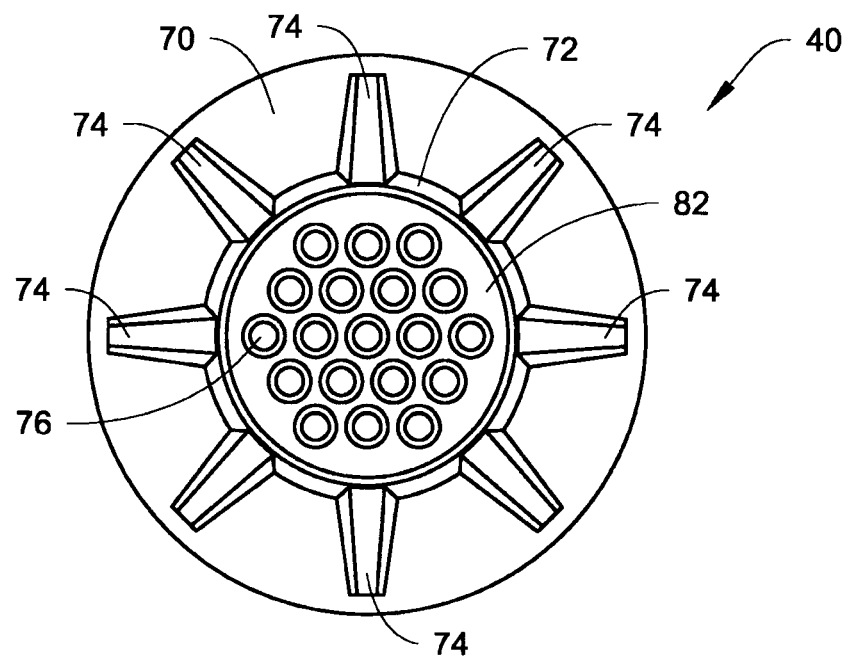
Figure 8C:
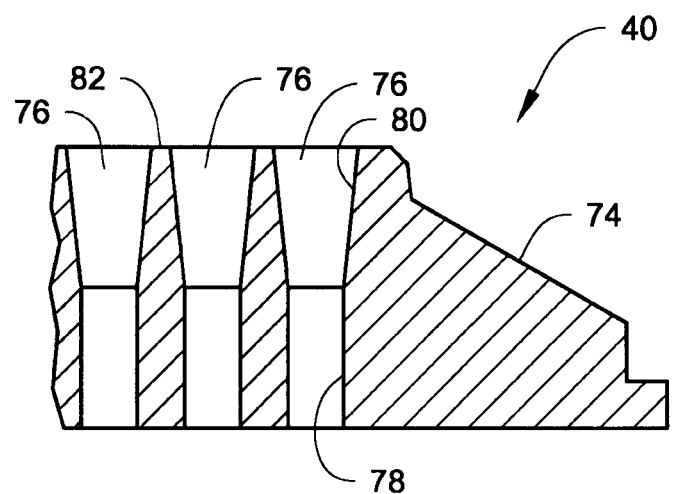

FIGS. 8A-B illustrate a total of 19 of the sub-strand through holes 76 in each anchor 40. However, a smaller or larger number of the holes 76 may be provided. It is preferred that there is one hole 76 for each sub-strand 62. Referring to FIG. 8C, each hole 76 includes a constant diameter portion 78 and a tapered portion 80 that intersects an outer surface 82 of the central boss 72.

The anchorage plate 70, the boss 72 and the ribs 74 can be an integrally formed, single-piece construction of metal or steel. In another embodiment, the post-tensioning strand anchor 40 may be composed of two or more separate parts, for example the central boss 72 (with the plurality of sub-strand holes 76) which is separate from the rest of the anchorage device such as the anchorage plate 70 and the ribs 74. The anchorage plate 70 would include one or more holes to allow passage of the sub-strands through the anchorage plate 70. The anchorage plate 70 may also have a central hub or recess that receives the central boss 72.

In another embodiment of a two-part strand anchor 40 that can be used, the central boss 72 may engage with an anchorage plate 70 which consists of multi-planes to better distribute the bearing stresses when embedded in the concrete.

In use, the base plate 70 of each anchor 40 bears on or is embedded within the perimeter edge 20 of the foundation 10, and the central bosses 72 face radially outward. The sub-strands 62 of the strands 38 extend through the sub-strand holes 76 and the sub-strands 62 are anchored to the anchors 40, for example using wedges (or caps) secured to the ends of the subs-strands that fit into the tapered portions 80 of the holes 76. The anchors 40 may bear on flat surfaces of the perimeter edge 20, or in another embodiment, some or all of each one of the anchors 40 may be disposed within countersunk holes formed in the perimeter edge 20. In the case of a multi-part strand anchor 40 as described above, the multi-part strand anchor may be completely embedded, partially embedded, or cast integrally with the concrete.

The post-tensioning system 30 described herein has a number of advantages. For example, some or all of the components of the post-tensioning system 30 can be removed and/or inspected in place, and can be replaced if necessary. For example, the anchor rods 36 and/or the strands 38 and/or the anchors 40 are removable for inspection and can be replaced. The rod anchors 34 can be inspected by removing the anchor rods 36 and directing an inspection scope down the anchor rod holes to inspect the threads and other parts of the rod anchors. In addition, some or all of the post-tensioning system 30 components may be re-used and/or the concrete foundation may be re-used. In another embodiment, the post-tensioning system 30 can be designed such that none of the components thereof are removable or replaceable.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A post-tensioning system of a wind turbine foundation, comprising:
   a plurality of rod anchors that are configured to be engageable with a bottom end of the center hub of the wind turbine foundation;
   a plurality of anchor rods having lower ends that are connected to the rod anchors;
   a plurality of post-tensioning strands, each post-tensioning strand is formed a multiple sub-strands;
   a plurality of post-tensioning strand anchors that are configured to bear on or be embedded within a perimeter of the wind turbine foundation.

2. The post-tensioning system of a wind turbine foundation of claim 1, wherein each one of the rod anchors includes a base plate.

3. The post-tensioning system of a wind turbine foundation of claim 2, wherein each one of the rod anchors further includes a central boss extending away from the base plate, the central boss including a threaded hole;
   the lower ends of the anchor rods are threaded and are engageable with the threaded holes of the central bosses.

4. The post-tensioning system of a wind turbine foundation of claim 2, wherein each one of the rod anchors includes an anti-rotation chine thereon.

5. The post-tensioning system of a wind turbine foundation of claim 1, wherein each one of the post-tensioning strand anchors includes an anchorage plate.

6. The post-tensioning system of a wind turbine foundation of claim 5, wherein:
   each one of the post-tensioning strand anchors further includes a central boss extending away from the anchorage plate, and a plurality of sub-strand through holes extend through the central boss, and at least sub-strand through hole extends through the anchorage plate.

7. The post-tensioning system of a wind turbine foundation of claim 1, further comprising a tower interface located opposite the rod anchors, and upper ends of the anchor rods extend through the tower interface.

8. A wind turbine foundation, comprising:
   a concrete structure having a center hub and a perimeter edge, the center hub including an upper end and a bottom end;
   a plurality of rod anchors that are engaged with the bottom end of the center hub;
   a plurality of anchor rods that extend through the center hub, the anchor rods having lower ends that are connected to the rod anchors;
   a plurality of post-tensioning strands, at least some of the post-tensioning strands extend through the center hub;
   a plurality of post-tensioning strand anchors that bear on or that are embedded within the perimeter edge.

9. The wind turbine foundation of claim 8, wherein each one of the rod anchors includes a base plate.

10. The wind turbine foundation of claim 9, further comprising a central boss extending away from the base plate in a direction away from the base plate, the central boss including a threaded hole;
    the second ends of the anchor rods are threaded and are threaded into the threaded holes of the central bosses.

11. The wind turbine foundation of claim 9, wherein each one of the rod anchors includes an anti-rotation chine thereon.

12. The wind turbine foundation of claim 8, wherein each one of the post-tensioning strand anchors includes an anchorage plate.

13. The wind turbine foundation of claim 12, wherein:
    each one of the post-tensioning strand anchors further includes a central boss extending away from the anchorage plate, a plurality of sub-strand through holes extend through the central boss, and at least one sub-strand through hole extends through the anchorage plate, wherein in use the anchorage plates bear on or are embedded within the perimeter edge and the central bosses face radially outward in a direction away from the center hub.

14. The wind turbine foundation of claim 8, further comprising a tower interface located opposite the rod anchors, and upper ends of the anchor rods extend through the tower interface.

15. A rod anchor of a post-tensioning system of a wind turbine foundation, comprising:
    a base plate, and a central boss connected to and extending away from the base plate, the central boss including a threaded hole;
    wherein in use the base plate is engageable with a bottom end of a center hub of the wind turbine foundation, and the threaded hole receives a threaded lower end of an anchor rod that extends through the center hub.

16. The rod anchor of a post-tensioning system of a wind turbine foundation of claim 15, further comprising an anti-rotation chine that is integrally formed with the central boss and the base plate.

17. The rod anchor of a post-tensioning system of a wind turbine foundation of claim 15, wherein the threaded hole has a closed end.

18. A post-tensioning strand anchor of a post-tensioning system of a wind turbine foundation, comprising:
    an anchorage plate, a central boss extending away from the anchorage plate, a plurality of sub-strand through holes extend through the central boss, and at least one sub-strand through hole extends through the anchorage plate;
    wherein in use the anchorage plate bears on or is embedded within a perimeter edge of the wind turbine foundation, the central boss faces radially outward, and a plurality of sub-strands of post-tensioning strands extend through the sub-strand through holes.

19. The post-tensioning strand anchor of a post-tensioning system of a wind turbine foundation of claim 18, wherein the anchorage plate and the central boss are an integrally formed, single-piece structure, or the anchorage plate and the central boss are separately formed from one another.

20. The post-tensioning strand anchor of a post-tensioning system of a wind turbine foundation of claim 18, wherein each sub-strand through hole of the central boss includes a constant diameter portion and a tapered portion, and the tapered portion intersects an outer surface of the central boss.

\* \* \* \* \*